Patented Feb. 25, 1941

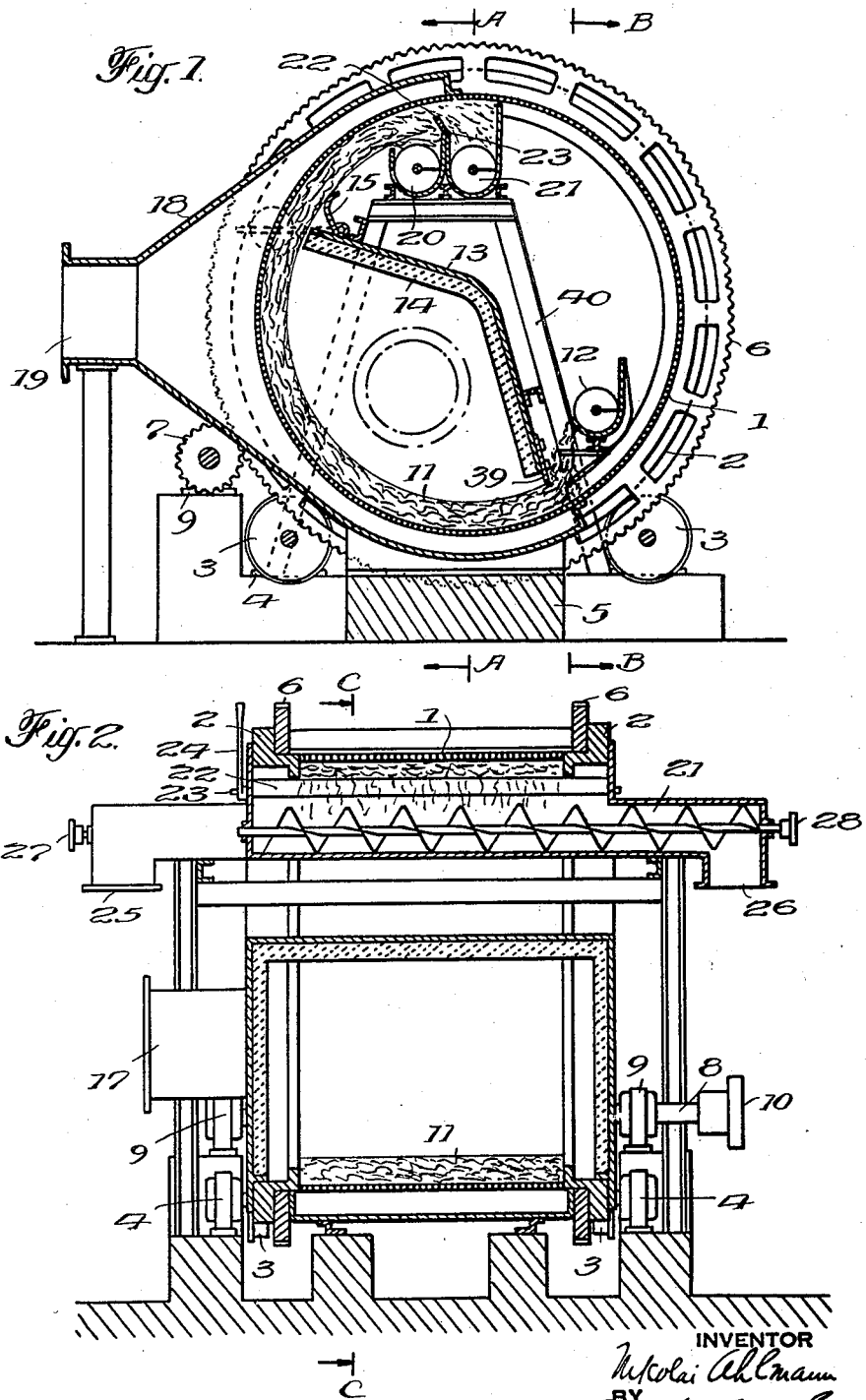

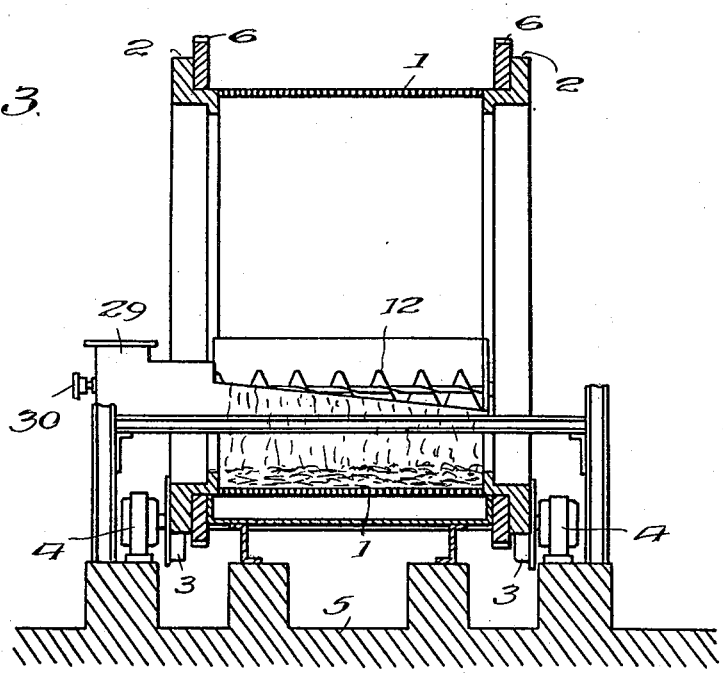
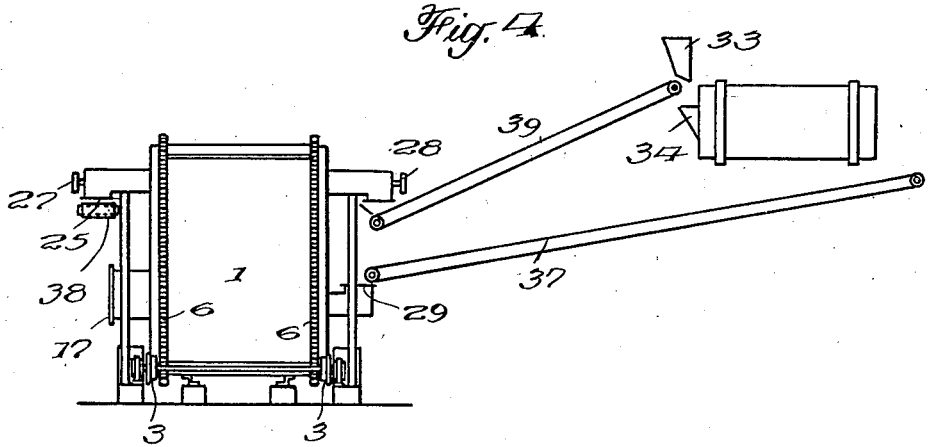

2,232,834

UNITED STATES PATENT OFFICE 2,232,834

PROCESS OF CALCINING LIME SLUDGE

Nikolai Ahlmann, Copenhagen, Denmark, assignor to F. L. Smidth & Company, New York, N. Y., a corporation of New Jersey Application November 24, 1939, Serial No. 306,025
In Great Britain November 24, 1938

1 Claim. (Cl. 263—53)

The present invention relates to the calcination of lime sludge of the kind appearing as a waste product in the manufacture of paper pulp or cellulose and other chemical industries.

According to my invention the calcination is effected by causing hot gases to flow through a layer of the sludge, in contradistinction to processes hitherto known for this purpose where hot gases sweep the surface of a layer of the sludge. According to my improved process a much more intense contact is ensured between the gases and the sludge to be calcined, whereby a better economy of the process is obtained, and an apparatus of smaller dimensions may suffice.

In calcining a product as liquid as lime sludge according to my invention the principal problem is to bring it into a suitable physical condition. This problem is solved by converting the sludge, by a method which will appear hereinafter, into a porous state and spread out to form a layer.

The calcining process is then carried on by passing hot gases through the layer but in such a way that only part of the layer is calcined, the remainder being only dried or partly calcined. This remainder is mixed with raw sludge and the mixture is worked up to form the above mentioned porous mass which can be formed into a gas-permeable layer. Of course, in order to start the process, sludge that has been previously dried must be used, but when the process is running the necessary dried sludge for mixture with the raw sludge can all be obtained from the grate on which the calcination takes place.

The conversion of the mixture of raw sludge and dried or partly calcined sludge into a homogeneous fine-grained porous mass may advantageously be effected in known devices for this purpose, for instance, in a rotary drum provided with inner quick rotating stirring members. It is desirable that the maximum grain size of the porous material should be below 3 mm. and the average grain size about 1 mm. In forming the porous mass it is necessary to regulate the water content very carefully, as this should not vary by more than about 0.1%. Apparently the percentage is somewhat lower when the material is dried at very high temperatures than if it is dried at a few hundred degrees C. The actual content necessary must be determined in any given case, but in general it is about 25%.

In the calcination or burning step, the hot gases are caused to flow through a layer of the porous material on a gas-permeable support, and their temperature depends, of course, upon the material but in general is in the order of 1000 to 1200° C. The thickness of the porous layer should be adjusted so that only part of it is fully calcined and the remainder is simply dried, but sometimes the remainder may be partly calcined as well as dried.

Naturally, it is best to work in such a way that the part that is only dried is just enough to mix with the raw sludge to form a porous mass of the proper consistency. The ratio between the dried part and the calcined part therefore depends upon the ratio between the water percentage in the limesludge and in the porous material. If the dried material is partly calcined as well as being dried, that is to say, if some of it is burned, the burned lime in it will be slaked by some of the water in the sludge, and this fact will have a substantial influence on the ratio between the dried material and the sludge. In general, the two parts should be about equal, that is to say, the layer after treatment is divided into two equal parts, one of which is fully calcined and the other of which is only dried or partly calcined and is returned for mixture with the raw sludge. When the first part is fully calcined, the second part may not be completely dry, and the drying may be completed by passing cold gas through the layer to take up heat from the calcined part and give it off again in completing the drying of the uncalcined part.

The apparatus in which the process is carried out may comprise a movable gas-permeable grate, means for feeding the sludge, converted into a homogeneous, porous mass, onto the grate to form a layer, means for causing gases to flow through the layer and the grate, means for separating the layer into two parts after the heat-treatment is over, means for removing separately both parts of the layer from the grate, means for bringing away one part of the layer, means for bringing the other part to a device for working up under addition of raw sludge a homogeneous, porous mass and means for transporting the porous mass to the feeding device for the gas-permeable grate.

In order more clearly to describe my invention one embodiment thereof will now be described by way of example with reference to the accompanying drawings, in which:

Figure 1 is a cross-section and Figures 2 and 3 longitudinal sections through the calcining apparatus proper, Figure 1 being taken on the line C—C in Figure 2 and Figures 2 and 3 being taken on the lines A—A and B—B respectively in Figure 1; and Figure 4 shows the whole apparatus in side elevation.

The calcining apparatus proper includes a rotary drum grate 1 surrounded by two live rings 2 supported by four rollers 3 which are arranged in pairs on shafts carried in bearings 4. The drum grate is power-driven through a coupling 10 on a shaft 8 which is carried in bearings 9 and on which are fixed two pinions 7 which mesh with toothed rings 6 fixed to the drum. The bearings 4 and 9 are mounted on foundations 5.

In operation the sludge is distributed in a uniform porous layer 11 over the inner surface of the grate 1 by means of a screw conveyor 12 and is carried in a clockwise direction by the grate as the latter rotates.

A hood 18 surrounds half the grate and has an outlet 19 connected to the suction side of a fan. Gases are drawn through the grate and layer on it and through the hood by this fan, which must be sufficiently powerful to set up such a pressure difference that the layer is held on the grate within the hood against the influence of gravity, use thus being made of the principle disclosed and claimed in Patents Nos. 2,024,453 and 2,123,593. Inside the grate, one part of the space is separated from the rest by a steel plate wall 13 having a refractory lining 14 and adjustable plates 15 and 39 which bear against the layer on the grate and so serve to seal the space bounded by the wall and the layer from the rest of the space inside the grate. The space thus bounded is furnished with a pipe connection 17 through which hot gases at the temperature necessary for calcination, e. g. 1100° C., enter the space, these gases being drawn through the layer and the grate into the hood. Above the wall 13 and within the hood 18, cold air is drawn in by the fan in order to take up heat from the calcined part of the layer and give it off again in completing the drying of the uncalcined part. Just before the layer arrives at the top edge of the hood 18, it encounters a scraper 22 which detaches the calcined part so that this falls into a trough containing a worm conveyor 20. The remainder of the layer, that is to say, the dried or partly calcined part, is carried on until it clears the hood 18, whereupon it falls off the grate under the influence of gravity into a trough containing a worm conveyor 21.

In order to ensure even distribution of the mass over the whole axial length of the grate, the trough in which the delivery conveyor 12 rotates is made with an inclined edge as is clearly shown in Figure 3. The conveyor 12 is fed through a hopper 29 and power-driven through a coupling 30. Suitable adjustment of the relative thickness of the two parts of the layer is obtained by varying the angular position of the scraper 22, this scraper being mounted on a shaft 23 which can be rocked by an operating handle 24 and then locked in position.

The wall 13 and the conveyors are all carried by girders mounted on supports 40.

In operation, the part of the layer that is wholly calcined is discharged through an opening 26 by the conveyor 21 which is driven through a coupling 28; this part falls on to and is taken away by a conveyor 39. The part that is only dried or partly calcined is discharged through an opening 25 by the conveyor 20 which is driven through a coupling 27 and this part falls on to a conveyor 38 and is carried to a hopper 34 into which it is discharged. Fresh limesludge is discharged into the same hopper 34 from a hopper 33 and the mixture of fresh sludge and dried or partly calcined sludge enters a device 32 for the preparation of the porous mass. This device may take any convenient form but advantageously it may be constructed as a rotary drum having inner quick rotating stirring members. In this drum, the limesludge is worked up into the right consistency for the formation of a porous mass and when it has attained this consistency, it leaves the drum through the open end 36 and falls directly on to a conveyor 37 which takes it to the inlet opening 29 for the screw conveyor 12.

I claim:

A method of calcining lime sludge as obtained as a waste product in the manufacture of cellulose, etc., which comprises mixing previously dried or partly calcined sludge with raw sludge to form a homogeneous porous mass, distributing the mass to form a layer, passing gases at a temperature sufficiently high to calcine the lime sludge through said layer for a length of time sufficient to fully calcine one part of the layer but insufficient to fully calcine the entire layer, the remaining part of the layer being only dried or partly calcined, separating the two parts of the layer, and returning the dried or partly calcined part for mixture with the raw sludge, the fully calcined part forming the final product.

NIKOLAI AHLMANN.